United States Patent Office 3,431,352
Patented Mar. 4, 1969

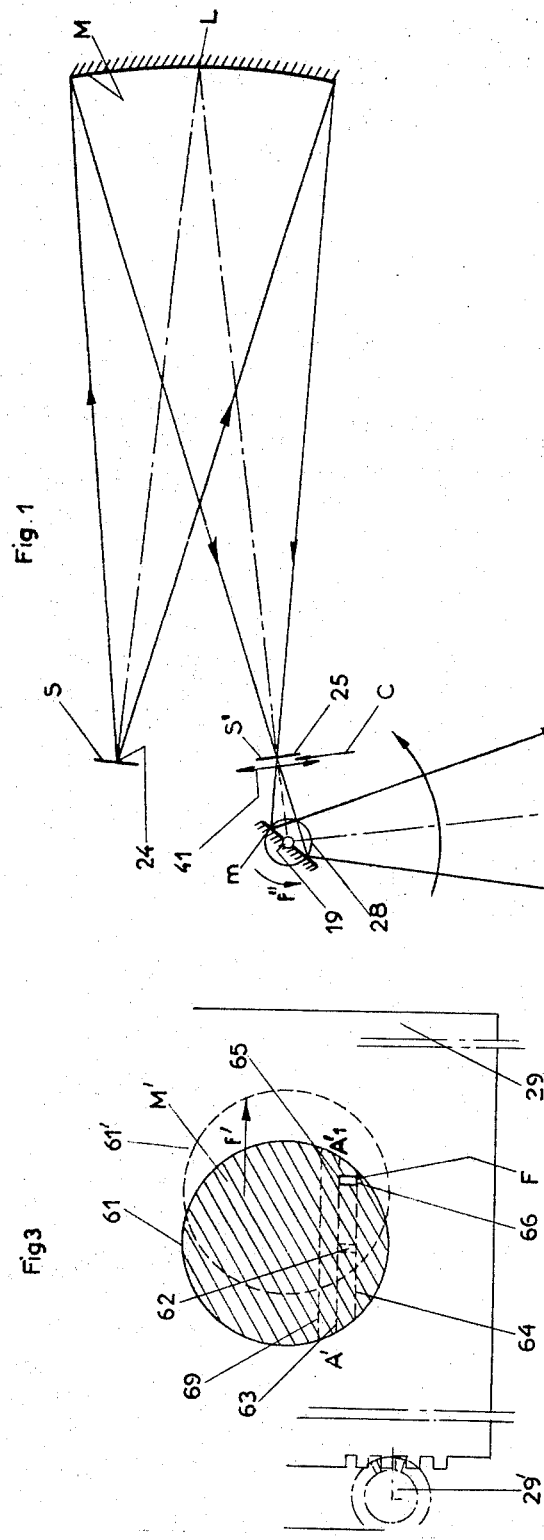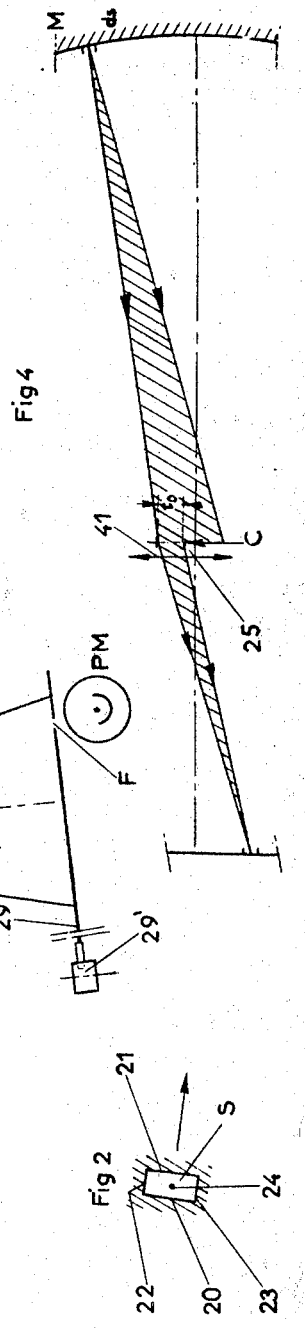

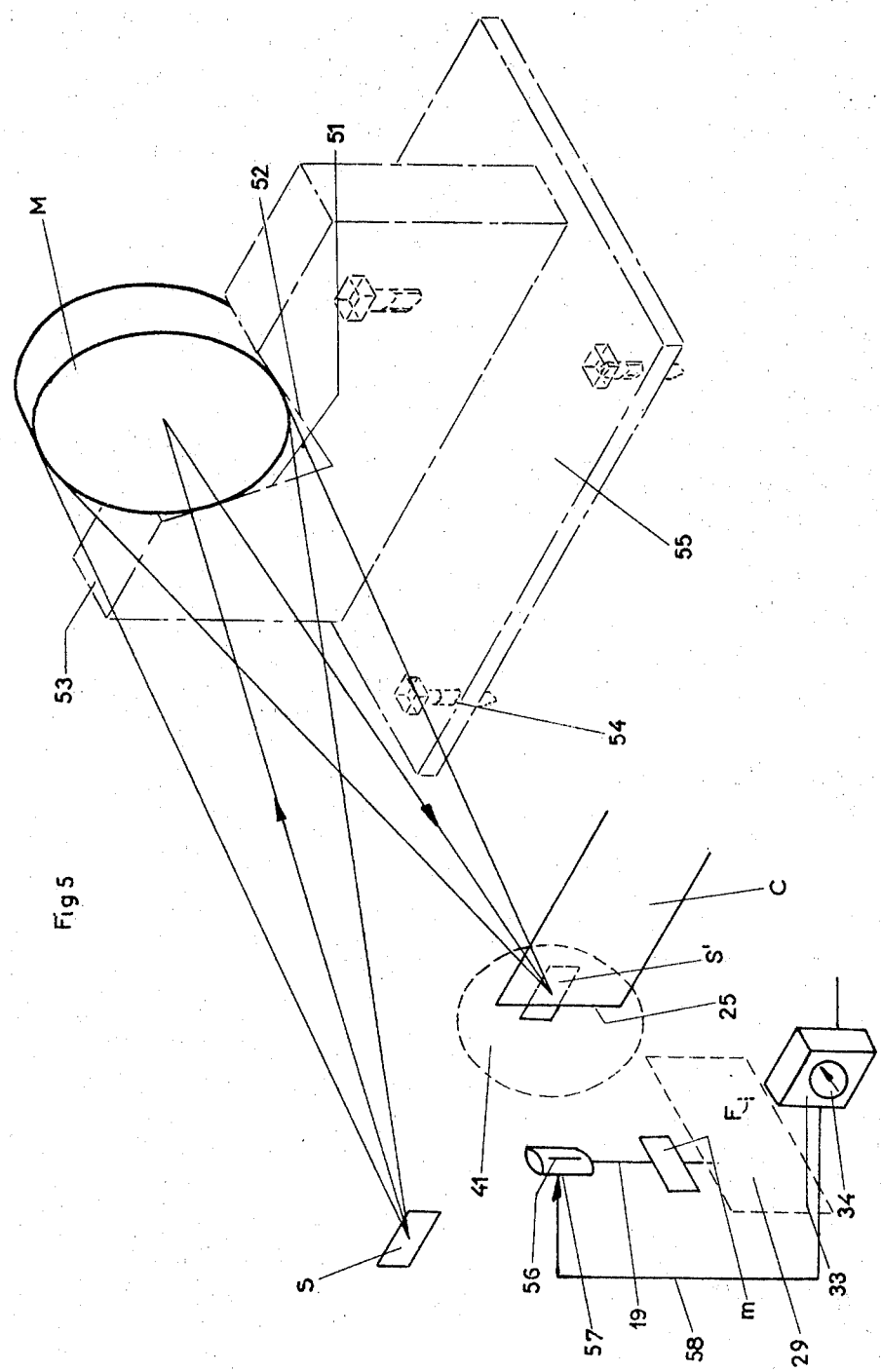

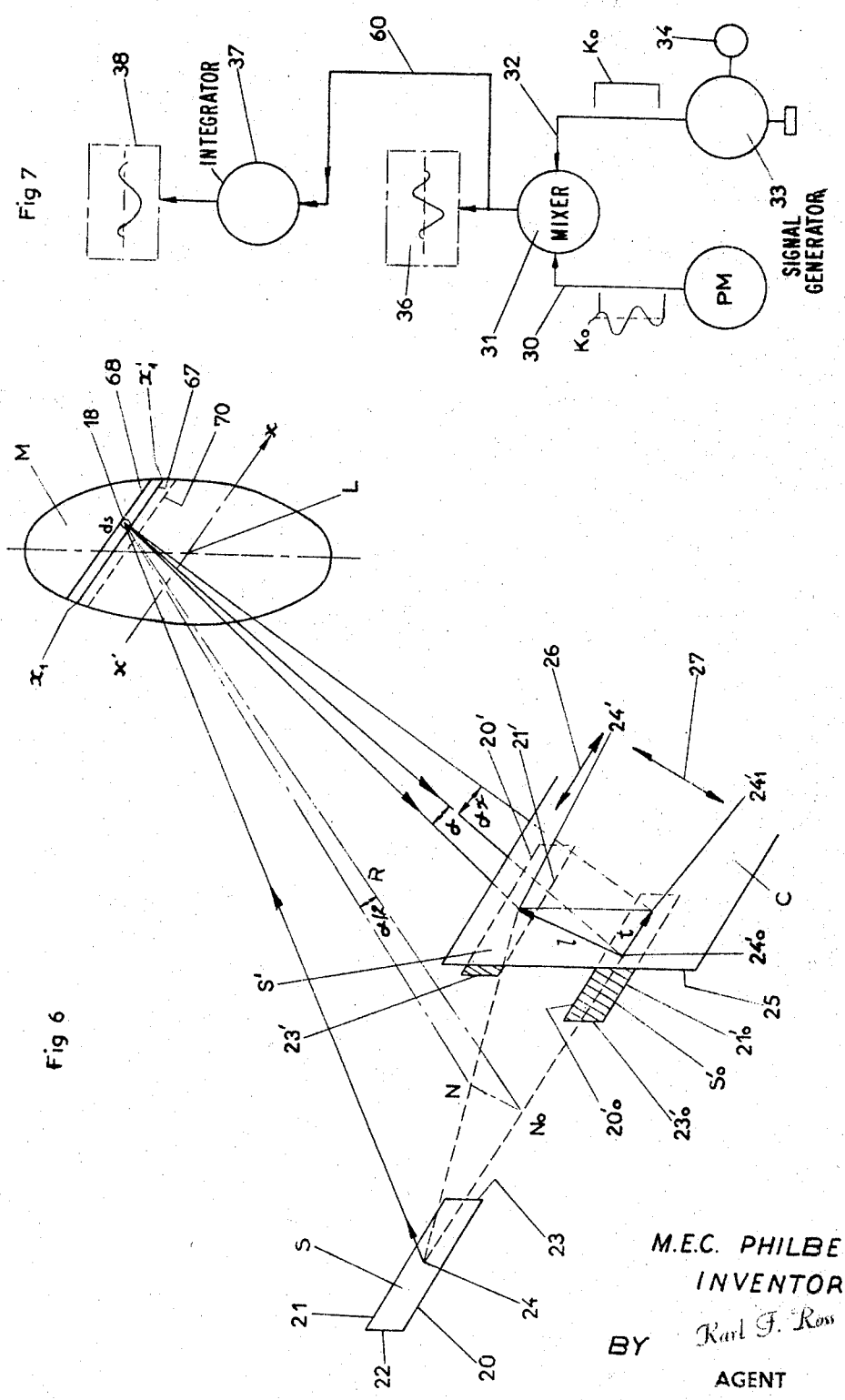

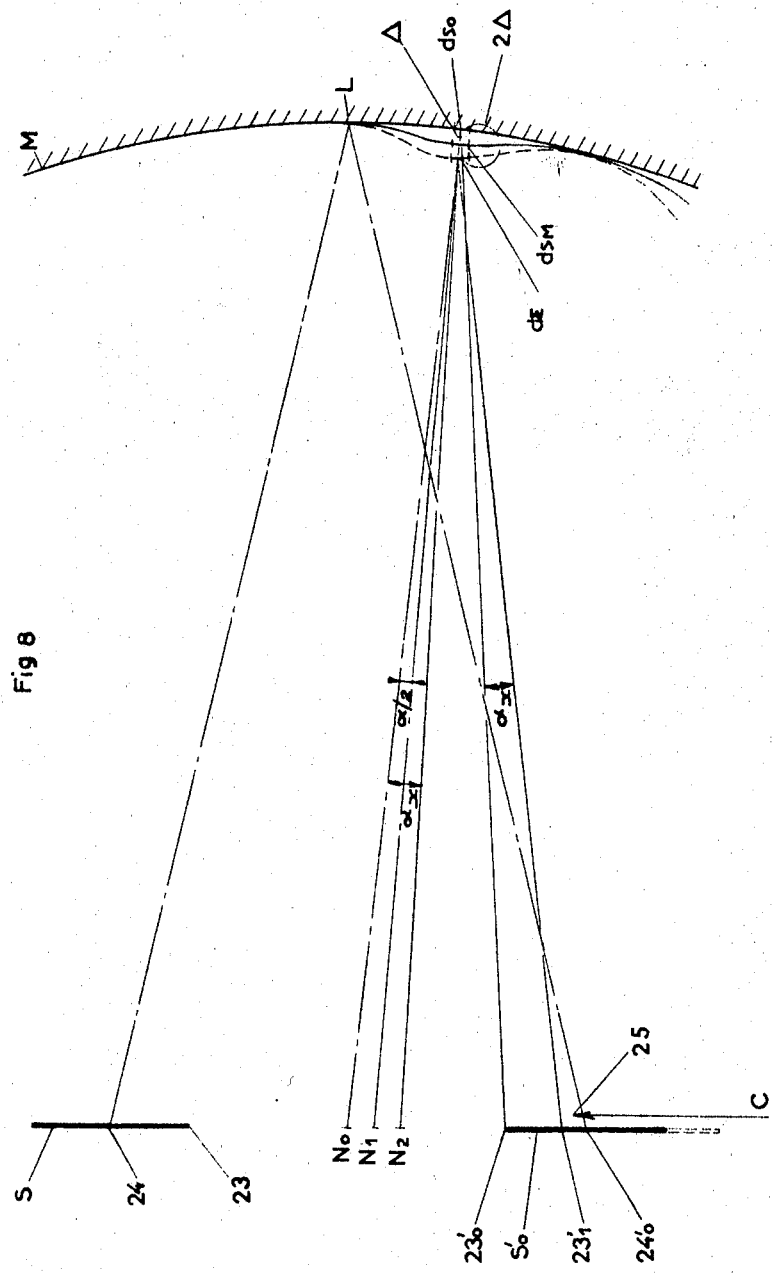

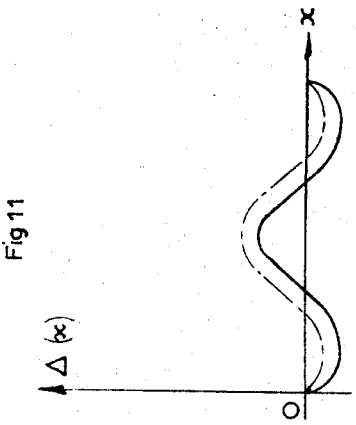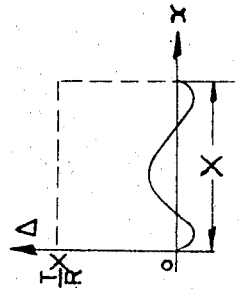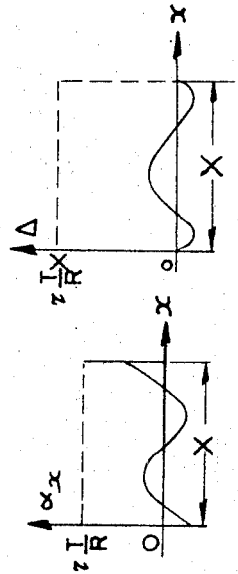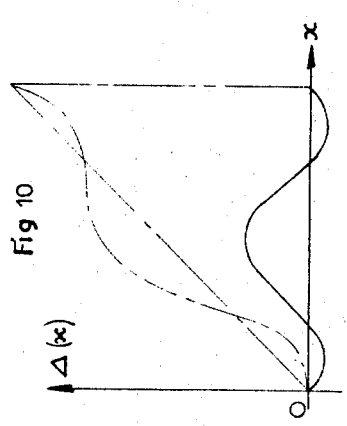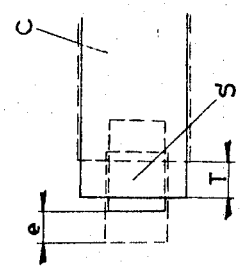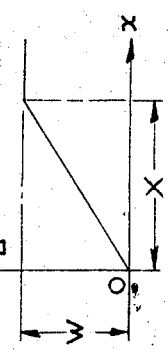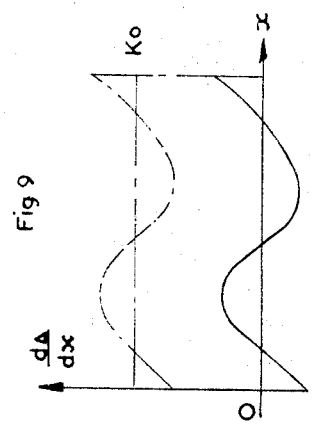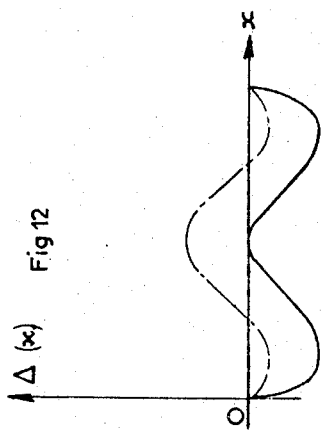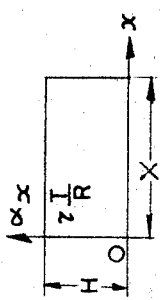

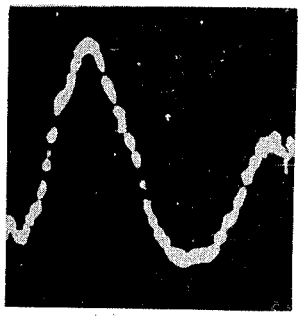
FIG. 18
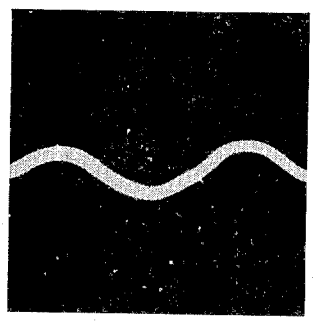
FIG. 19
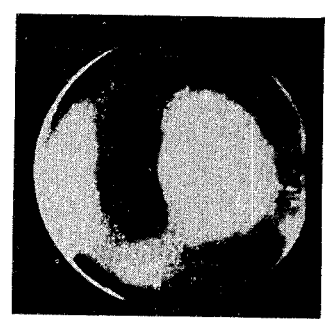
FIG. 20
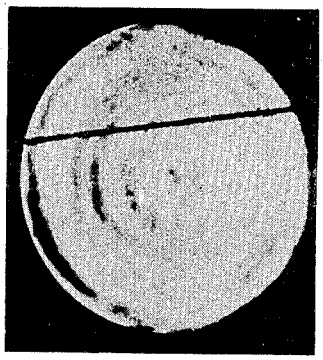
FIG. 21
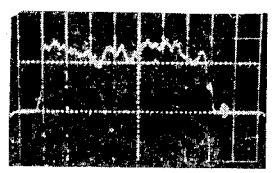
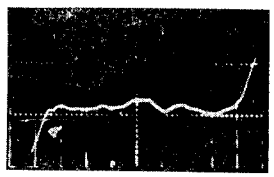
FIG. 24
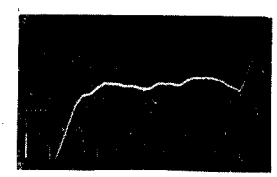
FIG. 23
FIG. 25
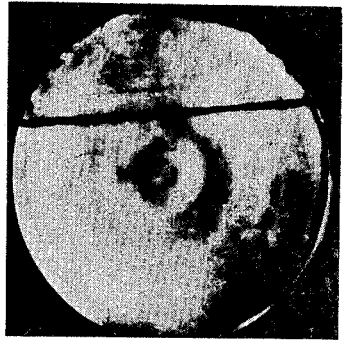
FIG. 26
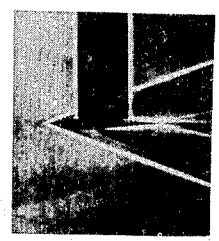
FIG. 32
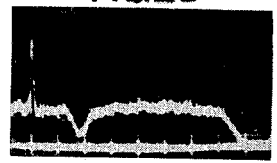
FIG. 33
FIG. 34
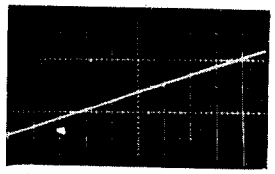
FIG. 35
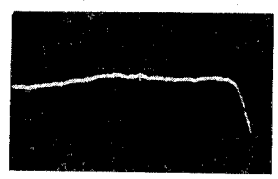
FIG. 36
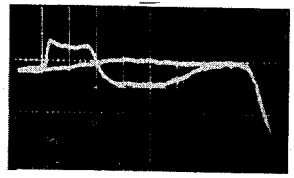
FIG. 37
Michel E.C. Philbert
INVENTOR.

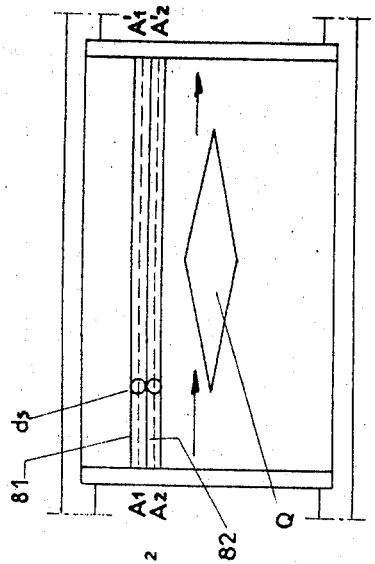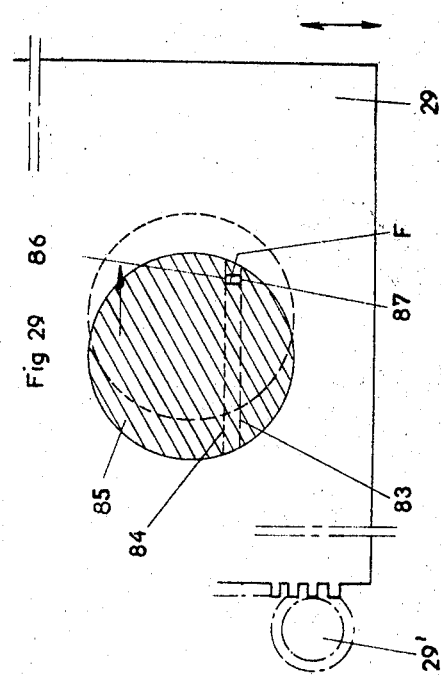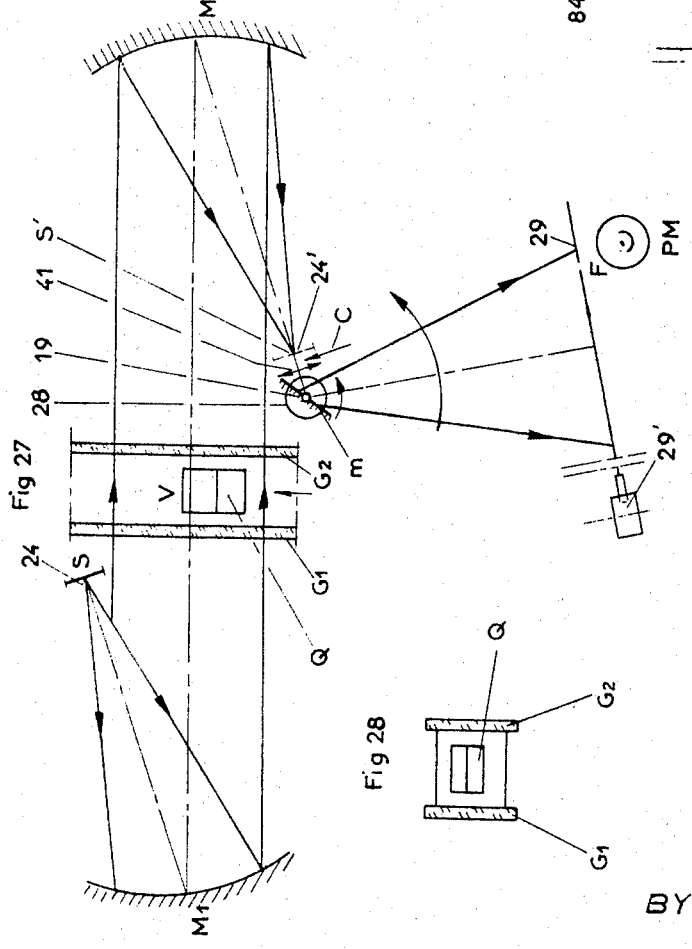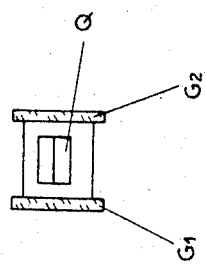

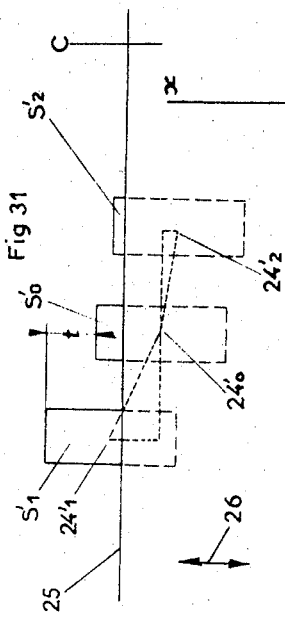
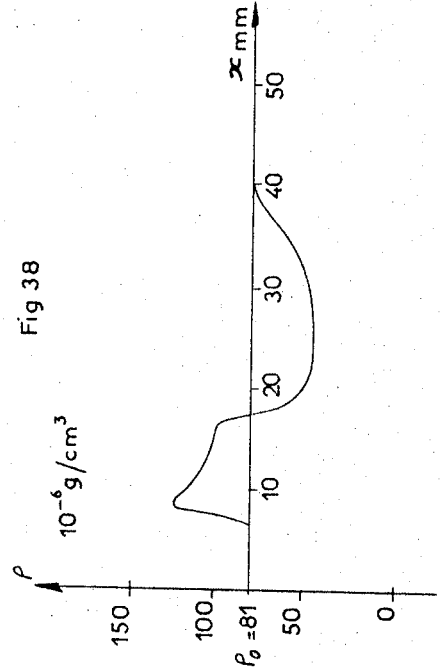

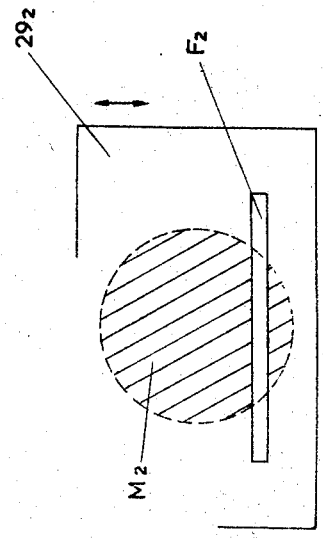
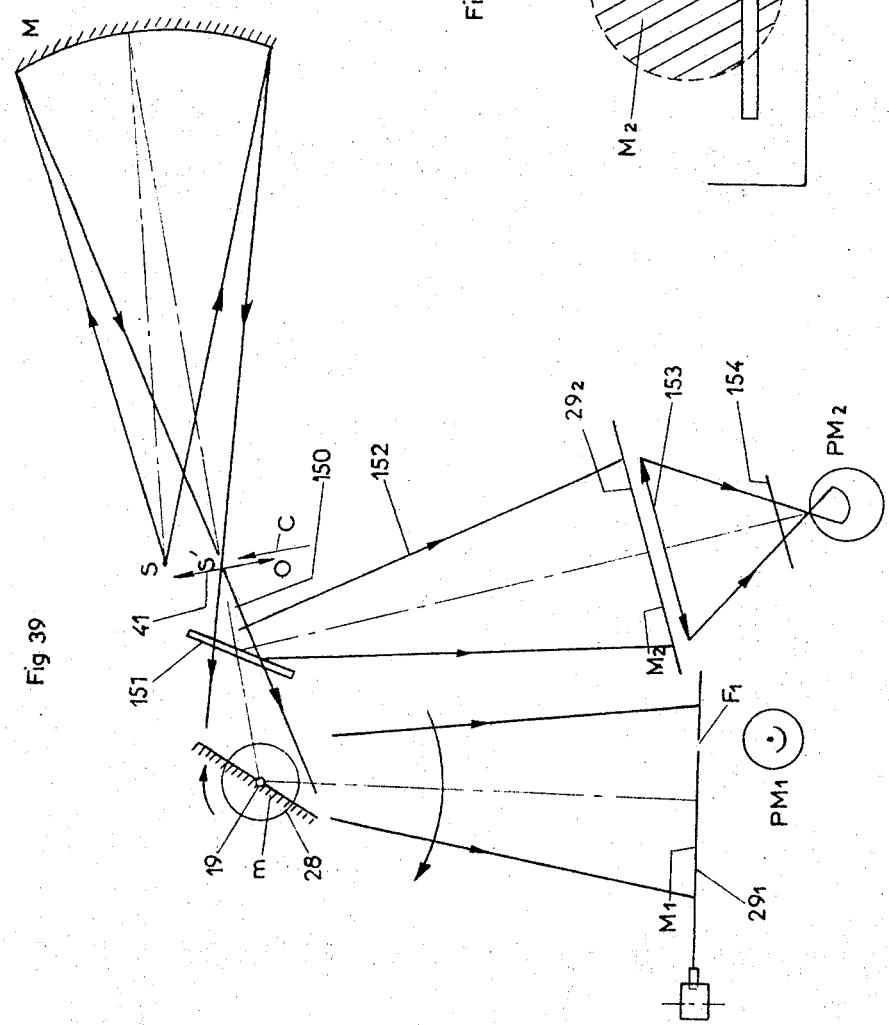

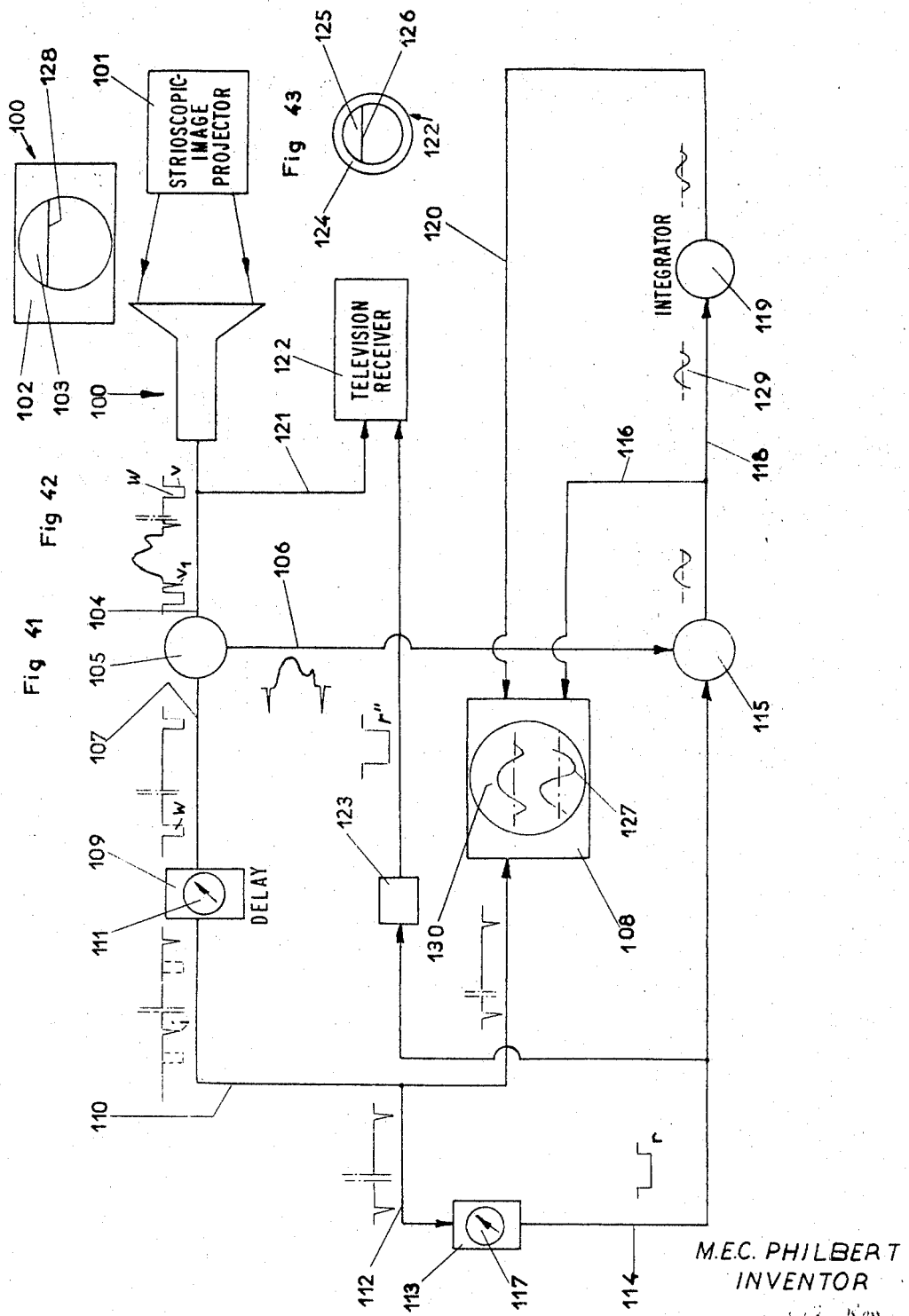

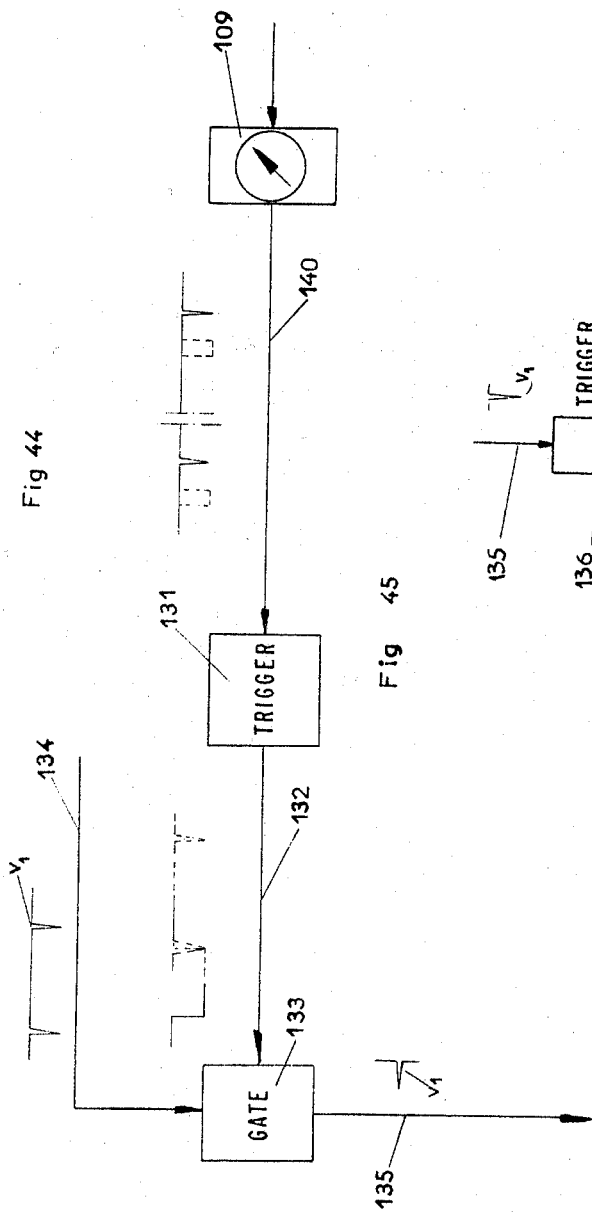
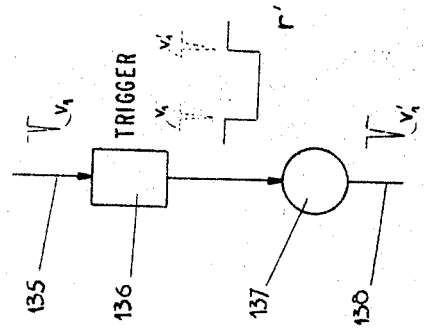

3,431,352
DEVICE FOR THE ANALYSIS OF PHENOMENA INVOLVING VARIATIONS IN OPTICAL PATH LENGTH
Michel Eric Charles Philbert, Paris, France, assignor to Office National d'Etudes et de Recherches Aerospatiales par abreviation (O.N.E.R.A.), Chatillon-sous-Bagneux, Hauts-de-Seine, France
Filed June 2, 1964, Ser. No. 372,042
Claims priority, application France, June 5, 1963, 937,101
U.S. Cl. 178—6      17 Claims
Int. Cl. G02f 1/32, 1/34

ABSTRACT OF THE DISCLOSURE

To check for irregularities on the surface of an optical reflector (e.g. a concave mirror) or for differences in the light transmissivity of a transparent fluid, light trained upon a test object through a rectangular entrance pupil is partly intercepted, after reflection from or transmission through the test object, by an opaque (Foucault) knife in the plane of an exit pupil constituted by the projected image of the entrance pupil; an unobstructed beam portion from a narrow segment of the test object, traversing the exit pupil, is evaluated electronically by a photoelectric transducer upon which this beam portion is focused.

---

The present invention relates to equipment for studying phenomena or elements involving optical-path variations, by partially occulting a radiant beam affected by said elements or phenomena and by analyzing the distribution of the illumination of the non-occulted portion of the beam.

In such a system, also termed sometimes a "schlieren or strioscopic" apparatus, an image-carrying beam is partially occulted by an opaque surface or knife known as Foucault knife. Such systems are generally used for observing phenomena involving optical-path differences which result in light-beam deflections, such as, for instance: the checking of mirrors, wherein the optical-path differences derive from defects in the mirror; or the analysis of fluid flows, e.g in wind-tunnel arrangements, in the neighborhood of a mock-up immersed in a gas stream, wherein the optical-path differences derive from the refractive-index variations related to pressure variations.

Up to the present, the schlieren or strioscopic method provides mostly qualitative information from observation of photographs of objects such as mirrors or fluids to be analyzed which show variations in shades (in black and white or in color), from which information is deduced relating to the phenomenon to be analyzed.

It is comparatively difficult, and in any case a lengthy and complicated operation, to derive therefrom useful quantitative information. The few methods proposed in this connection, such as those resorting to a color scale or to photographic sensitometry or to the measurement of the degree of blackness of a photographic plate at its various points in order to infer therefrom the light beam's deflections, are not readily carried into effect and involve a subjective estimate by the operator. The long interval of time separating the moment of occurrence of the phenomenon conisdered from that at which the results of the analysis are disclosed frequently lessens or even defeats the value of such methods.

The invention is characterized by the following features, considered separately or in combination:

(1) The schlieren analysis of the object or of the medium is effected by lines or narrow segments;

(2) These lines or segments are rectilineal and parallel;

(3) These lines or segments are adjacent to one another;

(4) The Foucault knife is adapted to move along its plane in perpendicular relationship to its edge;

(5) The Foucault knife may move in parallel relationship to itself and perpendicular to its edge;

(6) A photoelectric transducer such as a signal derived from the photocell, before being applied to the input of an oscilloscope, is mixed with a rectangular compensating signal;

(7) Said rectangular signal has an adjustable amplitude;

(8) The adjustment is achieved in such a manner that the signal derived from the mixing has a zero mean value;

(9) The signal resulting from the mixing is passed through an electronic integrator;

(10) The signal derived from the integration operation is rendered visible on the screen of a cathode-ray oscilloscope;

(11) The compensating signal added to the signal derived from the photocell is subjected to modulations by the vibrations of the equipment in such a manner that, in the resulting signal, the effects of such vibrations are compensated;

(12) Double prisms, such as those used in interferential schlieren techniques, are employed;

(13) According to an alternative embodiment, the line or segment analysis is achieved by scanning a schlieren image formed on a photocathode constituting the photoelectric transducer.

The invention has for one of its objects the provision of a schlieren system for obtaining oscillograms of both tangential and normal profiles, for the purposes of checking mirrors.

It is another object of the invention to provide means for checking aspherical mirrors by comparison of a schlieren signal with a signal supplied electronically and representative of the perfect aspherical mirror profile.

It is a further object of the invention to provide a system for determining aerodynamical effects by means of schlieren techniques, including means for carrying out, by segments or by lines, the analysis of the stream of a fluid under test, using a photomultiplier assembly or the like adapted to receive the light passing through one segment or line.

It is also an object of my invention to provide, as an industrial product, oscillograms obtained by carrying the aforedescribed measures into effect.

The invention will be best understood from the following description given with reference to the appended drawing wherein:

FIGURE 1 is a diagrammatic plan view of a device according to one embodiment of the invention;

FIGURE 2 is a front view of a light source included in the device illustrated in FIGURE 1;

FIGURE 3 is a plan view of a screen member formed with an opening;

FIGURE 4 is a diagram of a light beam processed by the schlieren technique and reflected by a mirror element to be checked for sphericity;

FIGURE 5 is a perspective view of the device illustrated in FIGURE 1;

FIGURE 6 is a diagrammatic perspective view of a portion of the device;

FIGURE 7 is a block diagram of the electronic circuit of the device;

FIGURE 8 is a diagram showing a wave surface;

FIGURE 9 shows a graph associated with the device;

FIGURE 10 shows a graph of curves after integration;

FIGURE 11 is a graph after integration, as adjusted for certain purposes;

FIGURE 12 is a view similar to FIGURE 11, as adjusted for certain other purposes;

FIGURE 13 represents a knife member in two positions;

FIGURE 14 is a diagram of the output of a photocell;

FIGURE 15 is a curve resulting from integration of the curve illustrated in FIGURE 14;

FIGURE 16 is a view similar to FIGURE 14, but for an alternative adjustment of the knife and at a substantially more reduced scale as to the ordinates;

FIGURE 17 is a diagram resulting from integration of that shown in FIGURE 16;

FIGURE 18 is a tangential-profile oscillogram of a mirror;

FIGURE 19 is a normal-profile oscillogram of said mirror;

FIGURE 20 is a schlieren picture of said mirror;

FIGURE 21 is a schlieren picture from another mirror;

FIGURE 22 is a tangential-profile oscillogram from the latter mirror;

FIGURE 23 is a normal-profile oscillogram corresponding to said latter mirror;

FIGURE 24 is a schlieren picture of still another mirror;

FIGURES 25 and 26 are tangential-profile and normal-profile oscillograms, respectively, of the last mentioned mirror;

FIGURE 27 is a diagrammatic view of a system according to one embodiment of the invention for investigating aerodynamic phenomena;

FIGURE 28 is a diagrammatic cross-sectional view of a fluid column used in the system of FIGURE 27;

FIGURE 29 is a front view of part of the equipment illustrated in FIGURE 27;

FIGURE 30 show diagrammatically the fluid column being analyzed together with a mock-up immersed therein;

FIGURE 31 shows various images in the plane of the knife;

FIGURE 32 is a schlieren picture of the gas flow around a mock-up;

FIGURES 33 and 34 are tangential-profile and normal-profile oscillograms, respectively, obtained by carrying into effect my novel technique of analyzing a gas flow;

FIGURE 35 is an oscillogram for establishing a scale;

FIGURE 36 is an oscillogram obtained under specific conditions;

FIGURE 37 illustrates two superposed oscillograms;

FIGURE 38 illustrates diagrammatically the resulting oscillogram;

FIGURE 39 shows an alternative embodiment of the system incorporating an additional improvement;

FIGURE 40 is a diagrammatic front view of part of the equipment shown in FIGURE 39;

FIGURE 41 is a further embodiment of a system according to the invention;

FIGURE 42 is a diagrammatic view of the partially illuminated screen of a television camera included in the system of FIGURE 4;

FIGURE 43 is a front view of a screen of a television receiver included in this system, showing diagrammatically a television picture;

FIGURE 44 is an improved embodiment of a device adapted to be used in the system illustrated in FIGURE 41; and FIGURE 45 is a diagrammatic view of a further improved device adapted to be used with said system.

In FIGURES 1 through 17 there is shown, in front of a concave "spherical" mirror M (FIGURE 5) whose sphericity is to be determined and which is carried by two V-shaped arms 51 and 52 of a block assembly 53, a rectangular light source or window S (FIGURE 2) formed with two major sides 20 and 21—the diameter of the mirror parallel to these sides being shown at $x$–$L$–$x$ (FIGURE 6) and with two minor sides 22 and 23 perpendicular thereto. The center 24 of window S, constituting an entrance pupil for radiant energy, is spaced apart from the apex L of the mirror by a distance substantially equal to the radius of the sphere on which the reflecting surface of said mirror is deemed to lie. A knife C is located in the plane which is conjugate, with reference to mirror M, to the plane of window S, and which thus contains the image of the window representing an exit pupil; the edge 25 of said knife (FIGURES 1, 4, 6) is perpendicular to the direction $L$–$x$ and parallel to a plane tangent to the mirror at its vertex L. In practice, with the window S illuminated by a light condenser and mirror M located approximately in the proper position, the position of mirror M will be accurately adjusted, for instance by actuating screw members 54 through which plate 55 carrying block 53 is resting on a table or the like, so that the image S′ of window S produced by mirror M is directly adjacent said window S. Means are provided as symbolized by arrow 26, for moving knife C in its own plane, parallel to said tangent plane, along a line parallel to line $L$–$x$, in one direction or the other. Means are also provided, as indicated by the double arrow 27, for moving knife C parallel to itself and perpendicularly to its own plane, causing it to recede from or approach mirror M. An image-forming lens 41 is placed substantially in the plane of knife C (FIGURE 1). Spaced apart from the "spherical" mirror M at a greater distance than knife C is a plane mirror $m$ (FIGURE 1), rotatable about a shaft 19 having an axis in the plane of said mirror $m$ and perpendicular to the plane defined by point 24, vertex L and the center of image S′. Means are provided to rotate mirror $m$ (arrow $f″$) about axis 19 with a uniform motion, such means being outlined at 28. In the area scanned in the direction of arrow $f′$ (FIGURE 3); by a beam reflected by mirror $m$ upon illumination thereof by light issuing from window S and reflected by mirror M, and in the plane of the image of mirror M projected by lens 41 there, is placed an opaque screen 29 formed with a small hole or scanning aperture F which, in the example illustrated, has a rectangular outline whose minor sides are perpendicular to the direction of the axis of rotation 19. At the rear side of screen 29, and opposite hole F, there is located a photomultiplier PM responsive to the radiation issuing from window S.

The invention provides transport means to move screen 29, in a direction perpendicular to the direction indicated by arrow $f′$, after each complete revolution of mirror $m$ and to an extent just equal to the size of hole F in said perpendicular direction, these means being shown at 29′. Photomultiplier PM partakes of the motion of screen 29.

Instead of a motion of screen 29 after each revolution of mirror $m$, and an arresting of said screen during the completion of the succeeding revolution, the invention also contemplates a continuous travel of screen 29 such that, during the period of a complete revolution of mirror $m$, screen 29 moves a distance equal to the dimension of hole F in a direction perpendicular to that of arrow $f′$.

Alternatively, screen 29 may be stationary while mirror $m$ and its driving motor may rotate about an axis perpendicular to the rapidly rotating shaft 19 and parallel to screen 29, in such a manner that upon the fast scanning movement of the illuminated area M′ in the direction $f′$ there is superposed a slow movement in the perpendicular direction.

The signal generated by photomultiplier PM is applied, through a lead 30 (FIGURE 7), to an electronic mixer device 31 which receives, on the other hand, through a lead 32 a rectangular signal pulse emitted by an electronic device 33, means 34 being provided to adjust at will and independently from one another the amplitude and the length of said rectangular signal. A rotary contact 56 (FIGURE 5) is secured onto shaft 19 of mirror $m$, and a wiper 57 cooperates with said contact; this wiper has an adjustable angular position and is connected to device 33 by means of a circuit 58 to trigger the generation of the rectangular signal supplied by said device in a predetermined angular position of mirror $m$. The signal supplied by mixer 31 is rendered visible by a cathode-ray oscillograph 36. The latter signal is in addition applied by a branch circuit 60 to an electronic integrator 37, such as, for instance, a Miller integrator, whose output signal is rendered visible by a cathode-ray oscillograph 38. It is also possible to use but a single cathode-ray oscillograph, either a two-beam oscillograph or a single-beam oscillograph, preceded by a switching device towards which are conveyed, at will, either the signals derived from mixer 31 or those issuing from integrator 37.

The device operates as follows:

The radiation passing through window S and reaching mirror M is reflected by the latter and passes through image S' optically conjugated with window S with respect to mirror M. A portion of this radiation passes through lens 41, while the remainder is stopped by knife C. The unobstructed portion of the radiant beam is focused by the lens 41 to generate an image M' of mirror M which, upon reflection by mirror $m$, is projected onto screen 29; this image M' has a circular contour 61 corresponding to the contour of mirror M and thus forms a circular zone of greater or less brightness with respect to the dark background of screen 29. In the drawing, this zone is indicated by haching (FIGURE 3). By virtue of the rotary motion of mirror $m$ about its axis 19, this image M' moves over screen 29 with respect to the hole F formed therein, the direction of this motion being indicated by arrow $f'$ (FIGURE 3) when mirror $m$ rotates in the direction of arrow $f''$ (FIGURE 1). Photomultiplier PM receives, at each instant, the amount of radiation passing through hole F. It is obvious that the rate of this radiation is proportional to the illumination of that portion of image M' which registers with hole F. At the following instant, on account of luminous zone M' moving in the direction of arrow $f'$, another portion of said zone, for instance the one indicated at 62, will register with hole F, the contour 61 having then reached the position indicated at 61'. During this motion of the image, a strip-like portion or segment of this image, defined by straight lines 63 and 64 parallel to the direction of movement $f'$ and coinciding with the minor sides 65 and 66 of hole F, moves past this scanning aperture. Photomultiplier PM will thus receive, via hole F, an amount of radiation which varies with the illumination of the various areas of said strip portion. In fact, the strip portion bounded by straight lines 63 and 64 of zone M' is the image of a strip portion or segment of mirror M defined by straight lines 67 and 68 (FIGURE 6) perpendicular to the axis of rotation 19 of mirror $m$. When, upon zone M' being displaced from one end to the other, the whole strip portion defined by straight lines 63 and 64 will have moved past hole F, it is, during the next rotation of mirror $m$ and on account of the relative motion imparted to screen 29, the strip portion adjacent said zone which moves past the hole, for instance the one bounded by straight line 63 and a parallel line 69. During this second movement, photomultiplier PM will thus receive an amount of radiation which corresponds to the illumination of the various areas of the strip portion bounded by lines 63 and 69 and, consequently, to the amounts of light conveyed by the portions of mirror M located between lines 67 and 70 of which said areas form the images.

In FIGURE 6, there is represented by a rectangle $S'_0$ the image of entrance pupil S that would be produced by an element of a perfect spherical mirror whose center $N_0$ is equispaced from the centers of window S and its image S' and whose radius R is equal to the distance between point $N_0$ and the vertex L of the mirror. The portion of image $S'_0$ hachured in this figure is formed by light beams which cross the plane of knife C and thus reach screen 29. If all elemental areas $ds$ of mirror M, on portion $x_1$–$xI_1$ bounded by lines 67 and 68, are on the theoretical sphere of radius R and center $N_0$, those elements give rise to identical exit pupils image $S'_0$, centered on point $24'_0$ which constitutes the image of center 24 of window S; the illumination of strip $A_1$–$A'_1$ on screen 29, bounded by lines 63 and 64, is uniform and the amount of light passing through hole F and reflected from any element $ds$ of the analyzed strip portion of mirror M, during the movement of the bright area M' on said screen, is constant; this is the light passing through the hachured area defined by the image $23'_0$ of side 23, by the knife edge 25, and by the portions of the images $20'_0$ and $21'_0$ of sides 21 and 20 extending beyond this knife edge 25. Under these conditions, the signal at the output of photomultiplier PM has the shape of a rectangular pulse whose height corresponds to the amount of light, which is constant, striking said photomultiplier PM at each instant.

In the event that an elemental area $ds$ located at point 18 of portion $x_1$–$x'_1$ of spherical mirror M does not merge with the theoretical spherical surface, the normal to said mirror at that area, instead of inserting the plane of knife C substantially at $N_0$, will intersect same at a point N and the image produced by element $ds$ of window S, instead of being at $S'_0$, is at S'. The amount of light derived from said surface element $ds$ which then reaches strip $A_1$–$A'_1$, and which during the rotary motion of mirror $m$ passes through hole F when the image of element $ds$ registers with said hole, is that which crosses the hachured portion of rectangle S', i.e. the one which is bounded by image 23' of side 23, the portions of line images 20' and 21' projecting beyond edge 25 of knife C and said knife edge 25. In the example illustrated in FIGURE 6, the amount of light received by photomultiplier PM is then reduced, with respect to that corresponding to an element coinciding with the theoretical surface, by an amount proportional to the difference of the areas of the hachured portions of images $S'_0$ and S' extending beyond edge 25, said difference being proportional in magnitude and sign to the vector $t$ (FIGURE 6) connecting point $24'_0$ with point $24'_1$, which is the intersection of the parallel to edge 25 through point 24' with the perpendicular through point $24'_0$ to said edge.

Let $\alpha$ (FIGURE 6) be the angle formed by the line connecting points 18 and $24'_0$ with the line connecting points 18 and 24', $l$ the distance between points $24'_0$ and 24', then the relation $$l = R\alpha$$

is substantially correct.

If $\alpha_x$ is the projection of angle $\alpha$ on the plane passing through points 18 and $24'_0$ and parallel to line $x$–$x'$, $t$ being the projection of $l$ on said plane, then:

$$t = R\alpha_x$$

If $\Delta$ is the deviation of the actual mirror surface from the theoretical sphere at point 18, i.e. the distance therebetween measured along the normal to said sphere, the derivative $d\Delta/dx$ of $\Delta$ with respect to $x$ is equal to $\alpha_x/2$ and $$t = 2R \cdot d\Delta/dx$$

Since, however, the amount of light striking the photomultiplier PM is, at each instant, proportional to the value of $t$ plus a constant $t_0$ (FIGURE 4) corresponding to the length of the hachured portion of image $S'_0$, the output signal of photomultiplier PM is representative of the variable $$-d\Delta/dx + \text{constant}$$

In the case the surface normal of an element $ds$ is not coincident with an element of the theoretical sphere nevertheless passes through point $N_0$, the image of S produced by such element $ds$ merges with $S'_0$, i.e. $t=0$, but to that area $ds$ there will be adjacent other elemental areas whose surface normals do not pass through $N_0$.

The invention provides for adjustment of the electronic device 33 by the central 34, so that the amplitude of the rectangular signal supplied thereby is precisely equal and opposite to the magnitude $k_0$ of a reference voltage corresponding to the constant mentioned hereinabove, which is a function of the transverse adjustment of the knife, i.e. its displacement in the direction of the double arrow 26.

Referring to FIGURE 8:

$ds_0$ is an element of the theoretical sphere of center $N_0$, $ds_M$ is an element of the actual mirror M, $d\Sigma$ is an element of the wave surface, after reflection at the elemental mirror area $ds_M$, of a spherical wave originating at point $N_0$, $N_0$ is the center of the theoretical sphere of vertex L, $N_1$ is the projection on the plane defined by points 24, L and $24'_0$ of the intersection of the normal to $ds_M$ with the plane perpendicular to line $N_0$–L through point $N_0$, $N_2$ is the projection on said plane of the intersection of the normal to $d\Sigma$ with the plane perpendicular to $N_0$–L through point $N_0$, $23'_1$ is the projection of the edge image 23' (FIGURE 6), generated by element $ds_M$, on the plane 24, L, $24'_0$, and if Δ is the interval between $ds_0$ and $ds_M$, the distance between $ds_0$ and $d\Sigma$ is equal to 2Δ.

The slope of $d\Sigma$ relative to $ds_0$ is double that of $ds_M$ with respect to $ds_0$. The following relation stands:

$$N_0N_2 = 2N_0N_1$$

When the center of the incident spherical wave is shifted in the plane perpendicular to line $N_0$–L through point $N_0$, which corresponds to causing the same to rotate by a certain angle relative to the theoretical sphere, the emerging wave surface rotates relative to the initial wave to equal and opposite extent, whether this wave is spherical (perfect mirror) or distorted (actual mirror). Consequently, considering an incident wave originated at a point located on edge 23, the emerging wave surface will rotate by an angle $N_0 d\Sigma$ $23'_0$: deviation $t$ therefore will also represent the divergence at point $d\Sigma$ between the new wave surface and the spherical wave centered at $23'_0$ which the assumed perfect mirror would provide.

In a general way, it may be said that the electric signal corresponding to the uncovered portion of an image S' for a given element of the mirror is representative of the divergence (or the gradient of the optical path $2d\Delta/dx$) between the real wave surface—starting at edge 23—and a reference sphere centered on edge 25 of the knife. Under these conditions, the signal delivered at the output of mixer 31—i.e. the corrected signal—is therefore representative of the gradient or tangential profile of the optical path $2d\Delta/dx$ which gradient may be seen directly on oscillograph 36. The integration in integrator 37 of the corrected signal provides an oscillogram representative of $2\Delta(x)$, i.e. a normal profile oscillogram: such an oscillogram may be seen at 38 in FIGURE 7.

FIGURE 9 illustrates, on an enlarged scale, in broken lines the oscillogram of a tangential profile before the application of the correction signal and, in solid lines the same oscillogram after "correction," with 0 as the origin of the coordinates.

In FIGURE 10, the broken-line curve shows the integrated oscillogram obtained from the broken-line oscillogram illustrated in FIGURE 9, i.e. without the correction signal being applied, and the curve in solid lines shows the integrated signal obtained with the correction signal applied.

The adjusting means indicated at 26 (FIGURE 6) are set in such a manner that, account being taken of the defects of the mirror under test, there still remains a light flux striking screen 29, i.e. that any image S' should have an unobstructed portion beyond the edge 25 and a portion masked by knife C.

The adjustment means indicated at 27 shift knife C by a translation movement parallel to the optical axis of the mirror. Such a displacement is tantamount to establishing, as the new reference sphere, a sphere which is still centered on the knife but has a different radius, and it is with respect to this new reference sphere that the optical-path difference is then measured.

The shifting means 27 may be adjusted in such a manner that the integrated oscillogram presents, on both sides of the axis of the abscissae, maximum ordinates which are substantially alike. The integrated oscillogram will then represent the optical path variations with respect to the reference sphere which best fits the shape of the mirror surface and it is for such a setting that the oscillogram will provide the best calculated values of the defects of the mirror. Thus, FIGURE 11 shows, as an instance, in broken lines an oscillogram of the optical-path variations before adjustment of the setting means 27 and in solid lines the oscillogram obtained after the adjustment of the setting means.

Alternatively, the adjustment through said setting means 27 may be carried out in such a manner that the oscillogram is located, as a whole, on one side of the horizontal axis and tangent thereto. The deviations Δ are then reckoned from a theoretical sphere in terms of unilateral physical departures from its surface. FIGURE 12 shows, by way of example, in broken lines an oscillogram before adjustment and, in solid lines, an oscillogram after an adjustment of the last mentioned character obtained through the displacement of the knife by the means 27. It is such an oscillogram that is preferably formed to carry out slight alterations on a mirror. It should be recalled, at this point, that, generally, irregularities of a mirror are commonly figures of revolution about the axis of said mirror.

The invention enables almost instant determination of the numerical values of slopes $\alpha_x$ and deviations $\Delta(x)$ at each scanned point of the mirror. The method of operation is then as follows: An oscillogram representative of the tangential deviations is produced as well as an oscillogram representative of the normal deviations for a given strip of the mirror. Such oscillograms have been illustrated, as a reminder, in FIGURES 14 and 15. If the difference $e$ (FIGURE 13) between the maximum tangential deviation and the minimum tangential deviation is sufficiently large (of the order of a few millimeters), knife C is moved in the direction of the arrow 26 by a known distance T, for instance by means of a millimetric scale carried by the control means for the adjustment of said knife. The distance T must be of the same order of magnitude as the amplitude of deviations $e$. Under these conditions, a new oscillogram representative of the slopes or tangential deviations is then produced, as well as an oscillogram representative of the radical or normal deviations, by causing mirror $m$ to perform a new revolution without modifying the position of screen 29. The differences between the ordinates of corresponding points on the respective oscillograms representative of the slopes and the radial deviations will then correspond to the tangential deviation and to the normal deviation due only to the displacement T of the knife.

As concerns the slope, this difference represents an amount $T/R$, and as to the radius or length of the optical path, this difference, measured at the end $x'_1$ of strip $x_1$–$x'_1$ of length $X$ of the mirror, represents a quantity $X \cdot T/R$.

An alternative method of operation is as follows: The driving motor of mirror $m$ is stopped when the image of any element $ds$ of mirror M forms on hole F. The position of knife C is modified, by the means symbolized at 26, in such a manner that the shade observed at this point of the schlieren image on screen 29 is just at the boundary of black and white, i.e., starting from this position, a very small displacement of the knife in one direction will cause a black portion to register with hole F, while a displacement in the other direction will cause a white portion to appear at the same spot. From this position, the kife is displaced by a known distance T in the direction of arrow 26. The electronic device 33 is then actuated by means of an auxiliary contact; the oscillogram of the output signal of the photomultiplier PM, in the even the amplitude of the rectangular signal provided by device 33 is zero, is then a rectangular pulse whose height $T/R$ determines the scale of the tangential profile. The oscillogram of the integrated signal is a sloping line; the ordinate of a point corresponding to a scanning length X has a value $X \cdot T/R$; this value determines the scale of the normal profile. Thus, the oscillograms of both types may be calibrated and quantitative measurements may be carried out thereon.

When the amplitude of the tangential deviations $e$ is very small (say a few hundredths of a millimeter), the displacement T of the knife, which must be of the same order of magnitude as $e$, is difficult to measure. The method employed to this end is then as follows: The knife is moved parallel to arrow 26 over a length T sufficient to be measurable; a substance of known absorption power for the radiation utilized, referred to hereinafter as "density," is inserted in the flux before the same strikes the photomultiplier, thus, on one hand, avoiding the saturation of the latter, and, on the other hand enabling oscillograms to be obtained which do not overshoot the screen of the oscilloscope. If $\tau$ be the transmission factor of the "density" inserted, the graph of the slopes obtained is as shown in FIGURE 16. The diagram is rectangular, with an ordinate $H = \tau \cdot T/R$. The integrated oscillogram, representative of the optical-path variations, is shown in FIGURE 17. The graph is a sloping line segment connecting the origin of the deflection to an upper horizontal level of an ordinate equal to W.

This gradient W represents a value $\Delta(x)$ of the normal deviation which is:

$$\Delta(x) = \int_{x_1}^{x'_1} \tau \frac{T}{R} dx$$

$$\Delta(x) = \tau \frac{T}{R} X$$

where X is the length of the scanning segment across the mirror. In a practical numerical example:

R=5 m.
X=0.5 m.
T=5 mm.
$\tau = 10^{-2}$

If the amplitude of the rectangular pulse H (FIGURE 16) is 20 mm., the scale of slopes on the oscillogram of tangential profile corresponds to:

$5 \cdot 10^{-6}$ rad./cm.

If the gradient W is 50 mm., the scale on this normal profile corresponds to:

$1\mu$/cm.

During an experimental test, the rotating speed of mirror $m$ was such that the time of sweep of the luminous spot M' along a diametral zone was of the order of one millisecond. The dimension of the scanning aperture perpendicular to the direction of sweep was equal to one hundredth of the diameter of the luminous spot. The size of the aperture in the direction of filing was of the same order of magnitude as in the perpendicular direction. During another experimental test, the aperture was of a substantially circular contour.

FIGURE 18 illustrates an oscillogram of the tangential profile of a concave mirror of a radius equal to 3.50 meters, open at $R/10$. The scale is $3.5 \times 10^{-6}$ rad./cm. The slopes of the mirror have values equal to half those which can be derived from said oscillogram.

FIGURE 19 is an oscillogram of a normal profile for an analysis along a diameter of the mirror and at a scale of $0.4\mu$/cm. This diagram discloses the presence of a convex peripheral ring having a height of approximately $0.4\mu$.

FIGURE 20 is a photographic recording—or schlieren pattern—obtained from a schlieren image formed in the plane 29 by clamping the mirror $m$ in a fixed position.

FIGURE 21 is a schlieren pattern of a mirror with a diameter of 350 mm. and a curvature radius of 7,000 mm. (the black line across this schlieren pattern is the image of the connection utilized for clamping the mirror).

FIGURE 22 is an oscillogram of a corresponding tangential profile, obtained by carrying into effect the technique of my invention. The side of a square of the raster on which this oscillogram is traced corresponds to 2.8 segagesimal seconds. The deviation relative to the mean surface is $\pm 1.2$ seconds.

FIGURE 23 is a corresponding normal-profile oscillogram, obtained by carrying the invention into effect. Each side of a square of the raster shown represents $0.58\mu$. The deviations relative to the mean sphere are $\pm 0.065\mu$.

FIGURES 24, 25 and 26 are similar to FIGURES 21, 22 and 23, respectively, but relate to another mirror, also of a diameter of 350 mm. and a radium of 7,000 mm. In FIGURE 25, the side of a square represents 2 seconds of arc. The deviations relative to a mean wave surface are $\pm 1.4$ seconds. In FIGURE 26, the oscillogram of a normal profile, one square represents $0.25\mu$ and the deviations with respect to the mean sphere are $\pm 0.05\mu$.

On schlieren patterns such as those illustrated in FIGURES 20, 21 and 24, the blackness of any point is known to be a function of the degree of illumination impinging thereupon, which is proportional to the gradient of the optical path, i.e. to the deviation of the light beam at the corresponding point of the surface to be checked. To determine the tangential profile by means of the known method of photographic sensitometry, the degree of blackness is measured at each point of the schlieren diagram along a line, for instance through a microphotometric device, the values obtained being transferred to a graph as a function of the abscissa of the corresponding points. In order to determine the normal profile, a graphic integration of said tangential profile is effected relative to a conveniently selected axis. These operations require, on the whole, a considerable length of time and yield results of limited accuracy.

The system of my invention may be applied not only to the checking of reflecting spherical surfaces, as described above, but also to the testing of aspherical surfaces. Whereas in the application to a spherical mirror the signal provided by the photomultiplier cell is compared to a rectangular signal or pulse which corresponds to that which would be delivered by the cell in the case of a perfect spherical mirror, in the checking of aspherical reflecting surfaces the signal provided by the cell, during the checking operation, is compared to an electronically generated signal which would be the one delivered by the cell if the same received the scanning pencil beam resulting from the reflection on an aspherical mirror of the proper geometrical shape.

The determination of the comparison signal may take place through geometrical considerations expressing the relation between the perfect aspherical surface and a spherical surface whose output signal is a horizontal straight line.

In the event of a parabolic surface being tested by means of equipment according to the invention, with a knife at the curvature center of the surface to be checked, the deviations between the perfect parabolic surface and the sphere tangent to said surface at its vertex vary according to an $x^4$ law, where $x$ is the abscissa of a current point of the surface relative to the common vertex. In order to bring out the deviations between the actual surface and the perfect parabolic surface, a correction signal representing the function $x^3$ is then applied to the tangential profile, and a correction signal representing the function $x^4$ is applied to the normal profile, these signals being produced electronically. Thus, a direct test may be effected of the parabolic surfaces, as well as of other aspherical surfaces.

The system according to the invention enables general measurements of the deviations occurring between an actual wave and a theoretical, spherical reference wave.

It may therefore be used to measure aberrations in any optical systems which should produce such perfect spherical waves.

The invention thus extends to the checking or to the establishment of optical devices other than concave mirrors, for instance convex mirrors, plane mirrors and also lens-type optical systems.

The invention encompasses the various fields of application of the schlieren techniques and, besides the checking of mirrors as described hereinabove, is also applicable with advantage to the study of aerodynamic phenomena. A system similar to that already described may be used to this effect. FIGURE 27 is an embodiment of an arrangement particularly adapted to such a study. The light source, including a rectangular entrance pupil or window S, is located at a secondary focus 24 of a first concave spherical mirror $M_1$ which reflects back a beam of parallel light rays, and it is into this beam that the experimental fluids stream V is inserted, bounded, in the example illustrated, by two parallel-faced glasses $G_1$ and $G_2$ whose faces are perpendicular to the direction of the light rays of the beam. From the incident light beam received, a second concave spherical mirror $M_2$ forms a beam converging in a secondary focus 24', at the center of an exit pupil defined by the image S' of window S; and substantially in the plane of image S' there is located the Foucault knife C. This partially occulted beam then falls on a plane mirror m mounted for rotation about the axis 19, driven by means shown diagrammatically at 28. An objective or lens 41 is inserted in the beam in close proximity of knife C and derives from the fluid stream V, more particularly from a longitudinal plane thereof, an image in the plane of the opaque screen 29 formed with the hole which may again be rectangularly shaped and have its major edges parallel to the axis 19; beyond the hole F there is placed the photomultiplier PM. Means are again provided to move screen 29 in a direction perpendicular to the direction of motion of the fluid-stream image resulting from the rotation of mirror m, at this with the photomultiplier PM again following the motion of the screen.

The operation of the device is similar to that described hereinabove in connection with the equipment used in the checking of a spherical mirror. When fluid stream V is a perfectly isotropic medium, the signal delivered by photomultiplier PM is constant during the scanning of the hole F by the illuminated area moving across screen 29. During this motion, the successive images of the different elements $ds$ of strip portion $A_1-A'_1$ whose boundaries 81, 82 have as images the lines 83 and 84 of the illuminated area 85, passing along the minor sides 86 and 87 of hole F, successively register with said hole. Consequently, photomultiplier PM receives successively the amounts of radiation traversing the various elemental areas $ds$ of the strip, the radiation paths being affected by the passage across the fluid stream. When the fluid stream is nonisotropic, as, for instance, when a mock-up Q to be analyzed is immersed in the latter, the variations of the stream's optical index, which are related to the variations in the volumetric mass due to the presence of the mock-up, will result in variations of the output signal of photomultiplier PM and the measured values thereof, optimally after an electronic treatment, will provide a numeric information about the variations of the index or the variations of volumetric mass along the strip portion analysed. Subsequently, another strip portion $A_2-A'_2$, adjacent to the first, is analyzed, and so on, the passage from one strip portion to the other being attained by displacing screen 29 in the direction of the double arrow (FIGURE 29), this motion being also shared by the photomultiplier PM placed behind hole F. The invention also contemplates the provision of other means for the passage from one strip portion to another.

FIGURE 31 shows the position, relative to knife C, of an image $S'_0$ of window S formed by an element $ds$ when there is no disturbance in the fluid stream. In such a case, all the radiation passing through any other element $ds$ of the strip undergoing analysis will be focused in the same image $S'_0$. The illumination of each portion of the strip of the screen bounded by lines 83 and 84 being proportional to the amount of radiation traversing the plane of the knife, as determined by the area of the rectangle $S'_0$ which extends beyond said knife, is thus constant all over the strip; the output of photomultiplier PM, during the scanning of hole F by the illuminated area 85, is then a rectangular signal or pulse. When, on the other hand, a disturbance exists, the image of window S corresponding to an element of the fluid stream differs from image $S'_0$ and is, for instance, an image $S'_1$. The signal supplied by the photomultiplier in response to radiation from the latter element is then proportional to the unobstructed area of image $S'_1$ which, in the example illustrated, is larger than the precedine case. The difference between unobstructed areas is proportional to the distance measured along the perpendicular to the knife edge 25 between centers $24'_0$ and $24'_1$ images $S'_0$ and $S'_1$. This difference is proportional to the angle $\alpha_x$ between the lines of light paths through to points $24'_0$ and $24'_1$, respectively. The oscillogram plotted from the signal delivered by photomultiplier PM may thus be considered as representative of the "tangential" profile. The integration, in the algebraic sense, leads to the "normal" profile.

The invention is advantageously utilized for the study of two-dimensional flow systems, as created by a mock-up so placed in the fluid stream of a wind tunnel that its generating lines are perpendicular to the direction of flow, i.e. whose cross-section in planes parallel to the direction of flow is constant. The equipment is arranged in such a manner that the direction of the light beam traversing the fluid stream is parallel to the generating lines of the mock-up.

If $\rho$ is the volumetric mass at a point of the fluid stream and $n$ the refractive index of the fluid at said point, then, according to the law of Gladstone, the following relation may be stated:

$$n-1=k\rho$$

$k$ being a constant.

When the flow presents a two-dimensional structure, the volumetric mass and the refractive index are constant along any straight line parallel to the generating lines. The light beam being parallel to the generating lines, the optical path $\Delta$ corresponding thereto may be written as follows: $\Delta=nb$, $b$ being the thickness of the fluid stream.

Substitution of the value derived from the law of Gladstone stated above yields:

$$\Delta=(1+k\rho)b$$

When the wind tunnel is in operation and a mock-up is immersed in the fluid stream, a generally stable field of heterogenous volumetric mass builds up around said mock-up under test. The wave surface, after having traversed the fluid stream V, is consequently distorted and presents, with reference to the plane incident wave, variable deviations $\Delta$. The light rays normal at each point to the wave surface are variously deflected after passing through the fluid stream, and the component images S' of the light rectangle derived from the elementary portions $ds$ of the wave surface, i.e. the exit pupil, spread out in the plane of the knife. The observation field no longer appears uniformly illuminated.

Each point of the field presents an illumination proportional to the component $t$ of the image displacement in the direction perpendicular to edge 25 of knife C (after suitable selection of the origin from which the component $t$ is measured).

Using similar notations as before, we find:

$$t=f\alpha_x=f\cdot d\Delta/dx$$

where $f$ is the focal distance of the mirror and $$\alpha_x=d\Delta/dx$$

is the component of the deviation of the light beam in the direction perpendicular to the edge of the knife.

The analysis of the schlieren image formed on screen 29 thus enables the tangential profile $d\Delta/dx$ to be obtained and, after integration, the normal profile $\Delta(x)$ representative, but for a constant, of the distribution of the volumetric mass $\rho$ along the scanning line. The constant is defined by the volumetric mass $\rho_0$ in an undisturbed zone of the flow and is measured by another method, for instance an interferometer, or the like, or a pressure intake in an undisturbed zone of the flow.

For determining the numerical scales on both profiles, use is made of the same method as described above in connection with the checking of mirrors. Two oscillograms are traced, one for the tangential profile and the other for the normal profile, while the wind tunnel is in operation. The wind tunnel is then stopped and the knife is displaced by an arbitrary length T, using the adjusting means symbolized at 26, the edge 25 being thus displaced parallel to itself. An oscillogram of tangential profile is thus obtained, having the shape of a rectangular pulse. The latter represents the value of the deviation $T/f$, where $f$ is the focal length of mirror $M_2$. Said rectangular pulse is integrated to produce a normal profile which is a sloping line whose gradient, given as the ordinate difference between its end portions, represents the scale of values on the normal profile.

*Example of application of the method*

The above method was applied to the analysis of a hypersonic flow ($M=3.8$) around a cylindrical mock-up Q of diamond-shaped cross-section (see FIGURE 30). The characteristics were as follows:

Diamond-shaped profile

| | | |
|---|---|---|
| Length | mm | 24 |
| Height | mm | 2.10 |
| Half-angle at the apex | degree | 5 |

Gust-type wind tunnel

| | | |
|---|---|---|
| Nozzle | | $M=3.8$ |
| Free fluid stream: diameter | mm | 36 |
| Fluid used | | Nitrogen |
| Inner diameter of nozzle | mm | 44 |
| Mach number | | 3.8 |
| Generating pressure | millibar | 1545 |
| Fluid-stream pressure | do | 17.9 |
| Generating temperature | °K | 290 |
| Fluid-stream temperature | °K | 74.5 |
| Volumetric mass in undisturbed fluid stream g./cm.$^3$ | | $81.10^{-6}$ |

FIGURE 32 is a schlieren-diagram of the flow obtained by taking a photograph of the image formed in the plane of the screen carrying the hole.

On the schlieren-diagram, the bright portions and the dark portions correspond to gradients of oppositely directed volumetric masses. The shock wave originating the leading edge of the profile is seen, as is a small shock wave propagating from the trailing edge thereof. Both dark zones diverging from the profile are expansion zones.

These qualitative observations are accurately specified and numerical data are provided by means of the oscillograms obtained according to the invention.

FIGURE 33 is an oscillogram representative of the tangential profile resulting from the scanning of a straight line parallel to the direction of flow and located at 3 mm. from the means plane of the profile. On this oscillogram the scale of the ordinates, i.e. the slopes, corresponds to $24.10^{-5}$ rad/cm. and on the abscissae, 1 centimer represents 10.47 mm. of the fluid stream. This oscillogram shows the sudden variation corresponding to the crossing of the shock wave, while the measurement of the maximum ordinate enables a numerical evaluation. The oscillogram also discloses a slower variation in the opposite direction, corresponding to the crossing through the dark portion of the schlieren-diagram in FIGURE 32.

FIGURE 34 is the corresponding normal-profile oscillogram $\Delta(x)$. It is obtained by electronic integration of the tangential profile represented in FIGURE 33. On the oscillogram in FIGURE 34, the scale of the normal deviations on the wave surface corresponds to $0.63\mu$/cm., i.e., for the fluid stream considered, to a volumetric mass variation equal to $75.10^{-6}$ g./cm.$^3$ per cm. The scale on the abscissae is the same as in FIGURE 33.

The scale of the normal deviations $\Delta$ was obtained through the slope of the oscillogram which corresponds to the integration of a constant signal of $12\cdot 4\cdot 10^{-5}$ rad/cm. and which is shown in FIGURE 35. (The scale on the abscissae of said oscillogram is 4.188 mm./cm.)

FIGURE 36 is an oscillogram of a normal profile plotted before putting the wind tunnel into operation. It represents the distortions of the wave surface in the absence of any aerodynamic phenomena. These distortions are due to the optical quality of the mirrors utilized in the equipment. They may not, however, be neglected here since the aerodynamic phenomenon analyzed has comparatively low-intensity optical effects. (The maximum optical-path variation resulting from passing through the fluid stream corresponds substantially to $0.5\mu$, i.e. to the wave-length of light.) The abscissa scale on the oscillogram in FIGURE 36 is the same as in FIGURES 33 and 34. The ordinate scale is $0.63\mu$/cm.

FIGURE 37 shows the superposition of the normal profiles obtained before and during the wind-tunnel operation represented, respectively, in FIGURES 34 and 36. The resulting curve, constituting the difference of these two profiles, is typical of the pure areodynamic phenomenon, the influence of mirror defects having been eliminated. Such a curve is shown in FIGURE 38.

The invention also aims at facilitating the analysis of phenomena involving extremely small deviations of optical paths by utilizing, in lieu of a knife, double prisms in an arrangement similar to that used in interferential schlieren technique. This technique enables the studying of phenomena for which the deviation introduced remains sufficiently small for the resulting illumination variation in the input of the photomultiplier cell to be considered as proportional to the deviation. If white light is used during operation, the background shade is adjusted in the grey area of the central fringe.

The invention also provides means adapted to minimize or cancel the effects of the vibrations to which the equipment might be subjected. To this end, the signal supplied by the photomultiplier is made to traverse a high-pass filter adapted to eliminate the disturbance effect of the vibrations whose frequencies are, generally, lower than those constituting the signal. It is, however, also possible to compensate automatically for the disturbance effect of the vibrations in a manner which avoids the need for interposition of such a filter and which may be applied even if the scanning frequency is comparatively low, in order to achieve a particularly sharp analysis. In that event the correction signal applied to the output of the photomultiplier, which is of constant amplitude when the test object is a spherical mirror, varies as a function of the vibrations to which the equipment is subjected, so as to compensate at each instant the effect of the vibrations on the output signal of the photomultiplier. An embodiment of such a system is illustrated in FIGURE 39.

The assembly comprises an arrangement similar to that shown in FIGURE 1, i.e. a knife C located in the plane of image S' of light source S produced by the mirror M to be checked, in case the equipment is intended for such a purpose, a lens 41 being placed in such a manner as to generate, in the plane of a screen 29$_1$ formed with a hole $F_1$, an image of mirror M, while a rotating mirror $m$ is interposed in the light beam so that a photomultiplier $PM_1$ located at the rear side of hole $F_1$ receives, during the rotation of the latter mirror, the amount of light corresponding to that which, emanating from the various elements of a strip or line of mirror M conjugated with hole $F_1$ relative to lens 41, crosses the edge of knife C.

According to this embodiment, a portion of the beam 150 carrying the schlieren image is deflected before reaching mirror $m$, for instance by means of a semi-transparent plate 151, and a screen $29_2$ is placed transversely to the beam 152 reflected by plate 151 in a position conjugated, optically, of that of mirror M relative to lens 41. Screen $29_2$, which may be made integral with screen $29_1$, is formed with a slit $F_2$ (FIGURE 40) and means are provided in order that, at each instant, slit $F_2$ registers with the image of the tested strip of mirror M. These means may include a transport mechanism, as symbolized by the arrow in FIGURE 40, for moving screen $29_2$ perpendicularly to the direction of slit $F_2$ after each rotation of mirror $m$. It is also possible to provide, to this end, an assembly wherein the semi-transparent plate 151 is caused to rotate about an axis perpendicular to the axis 19 and located in the plane of FIGURE 39. A photomultiplier $PM_2$ is placed behind slit $F_2$ with interposition of a field lens 153, so that the light issuing from the portion being analyzed falls onto photomultiplier $PM_2$. During each scanning, said photomultiplier $PM_2$ receives an amount of light proportional to the total or to the average (if a "density" has been interposed) of the luminous energy successively conveyed by the various elements of the tested strip of mirror M which are oriented toward hole $F_1$. The signal supplied by photomultiplier $PM_2$ is mixed with that delivered by photomultiplier $PM_1$, the resulting signal being treated in a manner similar to that obtained in the embodiment of FIGURE 1. A "density" 154 is placed in front of the photomultiplier $PM_2$, thus defining a suitable origin of the diagram representative of the signal derived from unit $PM_2$. This signal is, obviously, affected by the vibrations to which the equipment is subjected and the effects of which are being felt both in the beam reflected by element 151 and in the beam traversing said element, so that, by mixing the signals supplied by photomultipliers $PM_1$ and $PM_2$, the compensation for said vibrational effects is automatically obtained. Advantageously, the "density" utilized has an adjustable value. It may be in the form of a disc member whose transmission factor is progressive and which can move to adjust the attenuation to the required value. In such a system, the possible fluctuations of the intensity of the light source likewise do not affect the schlieren signal obtained.

A similar arrangement may be utilized in the case of a system for the analysis of aerodynamical phenomena, the compensating signal being then derived from an undisturbed zone of flow, for instance upstream relative to the mock-up.

In the embodiments described hereinabove, the analysis is effected by means of a rotating mirror. The invention provides embodiments wherein the analysis is achieved by different means. The analysis of the schlieren image may, in particular, be obtained in a manner similar to that used in television for the transmission of image signals: this modification will now be described with reference to FIGURES 41–43.

An arrangement embodying the last-mentioned aspect of my invention comprises a television camera 100 and equipment 101 adapted to form, on the sensitized surface 102 of the camera, a schlieren image or strioscopic pattern 103 which presents areas whose differences in illumination were obtained by the schlieren technique. Unit 101 includes the aforedescribed entrance and exit pupils S, S′ and Foucault knife C.

The video signals $v$ in the output circuit 104 of the camera, which include line signals $v_1$ and frame signals $t$, are applied to a device 105 which transmits the same, unchanged, to a circuit 106 and, besides, transmits to a second circuit 107 only the frame signals. The frame signals $w$ are applied, through circuit 107, to a delay-producing electronic device 109 which supplies pulses $i$ to its output circuit 110 each of which corresponds to a frame signal $w$ and which trail these frame signals by a given delay.

The pulses $i$ delivered by device 109 are applied, through circuit 112, to an electronic trigger circuit 113 which, for each pulse $i$ it receives, supplies a rectangular signal $r$ of a predetermined length, which may be adjustable. The amplitude of the pulse $r$ may be adjusted by means of a controller 117 incorporated in device 113. The rectangular signal $r$ is applied, through circuit 114, to the input of a mixing device 115 which receives, on the other hand, the video signal $v$ through circuit 106. An output signal from mixer 115 is applied to an oscillograph 108 connected, on the other hand, to device 109, so that each pulse $i$ delivered by said device triggers the operation of the oscillograph for a scanning along one line, the scanning being discontinued until the arrival of a new pulse $i$. Output 118 of the mixer is also coupled to the input of an electronic integrator 119 whose output circuit 120 is connected to another cathode-ray oscillograph or, advantageously, to the second channel of oscillograph 108 whose first channel is connected to circuit 116. A circuit 121, branched off from circuit 104, applies the video signal $v$ to a television receiver 122 which receives on the other hand, through circuit 123, a rectangular signal $r''$ of the same length as signal $r$, of constant amplitude and easily derived from the signal $r$ itself.

The operation of the system just described is as follows:

When screen 102 of the camera receives a schlieren image, the television receiver 122 connected to the camera forms, on its screen 124 (FIGURE 43), an image 125 which is a schlieren picture. The pulse $i$ passed by device 109 causes the appearance, on the schlieren diagram, of a horizontal line 126, contrasting in dark or bright areas with the remainder of the schlieren diagram. By adjusting the delay-producing controller 109 by means of device 111, the contrasting line will move upwards or downwards and, for a given horizontal line, its origin may be made to vary so as to coincide with the edge of the schlieren diagram.

The same pulses $i$, applied to oscillograph 108, trigger the spot of the latter in order to display that portion of the signal which is applied at this instant to said oscillograph by circuit 116 and which corresponds to line 126. The oscillograph will thus cause the appearance, on its first channel, of a pattern as outlined at 127, which is representative of the illumination of line 128 of the schlieren image projected onto the sensitized surface 102 of camera 100, to which corresponds line 126 displayed on the monitoring receiver 122, as modified by the superposition of the rectangular signal $r''$. The pattern 127 is a "tangential profile" corresponding to the test objected analyzed according to the schlieren method by equipment 101, from which data may be obtained not only qualitatively, relating to the phenomenon investigated, but also of a quantitative nature.

Integrator 119 supplies a signal, displayed in the second channel of oscillograph 108, which is a pattern 130 representative of the normal profile corresponding to the selected segment of the test object analyzed by equipment 101. An inspection of the screen 124 enables ascertainment at each instant of the location of the portion of the object or of the phenomenon being analyzed.

According to FIGURE 44, illustrating a further alternative embodiment, device 109, which generates the pulses $i$, is connected through circuit 140 to a trigger device 131 which is connected, through circuit 132, to a gate 133 which further receives, through circuit 134, the line signals $v_1$. The output 135 of gate 133 is coupled both to the generator 113 of the rectangular signals $r$ and to the cathode-ray oscillograph 108 shown in FIGURE 41. In this embodiment, gate 133 inhibits the passage of any line signal $v_1$ as long as it receives no signal from trigger device 131. The latter, when receiving a pulse $i$ from device 109, delivers a rectangular signal which unblocks gate 133 so that the latter clears to the first line signal $v_1$ applied thereto by circuit 134 and is blocked immediately afterwards until the incidence of the next rectangular signal via circuit 132. The signal $v_1$ thus traverses gate 133 and is applied to device 113 and to oscillograph 108; this gating pulse $v_1$, which corresponds always to the starting of a line, does not vary in its time position relative to a frame signal $w$. This eliminates shifts of images 127, 130 on the screen of the oscillograph 108, which would result from divergences between the delay introduced by device 109 and the time interval separating a frame signal from the start signal of the line being analyzed.

As shown in FIGURE 45, which is an additional improved embodiment, the circuit 135 of FIGURE 44 is coupled to the input of a trigger device 136 whose operating period may be adjusted by means of a control unit incorporated in said trigger device, and it is the trailing edge of the rectangular signal $r'$ delivered by said trigger device which serves to create, in a device 137, a pulse $v'_1$ which, through a circuit 138, is applied both to device 113 and to oscillograph 108. Oscillograph 108 and device 113 may thus be synchronized, not on a line-starting signal, but on the effective beginning of a schlieren diagram, which is desirable in the case the schlieren diagram provided by equipment 101 is completely inside the field of the sensitized surface of the television camera 100.

It will thus be seen that my new system utilizes radiant energy from a light beam partly obstructed by blocking means C to project a strioscopic pattern onto a receiving surface, such as the screen 29 or 102, for the purpose of energizing a photoelectric transducer such as multiplier PM or television camera 100 to give rise to an electrical output signal varying with the width of the beam; this beam width is a function of the position of the exit pupil S' which, in turn, is subject to variations in accordance with the direction of incidence of the light rays focused upon the exit pupil by such optical means as the concave mirror M or $M_2$.

What I claim is:
1. A system for ascertaining optical-path differences, comprising:
   a light source including means forming an entrance pupil;
   first optical means for focusing light rays from said source into an image of said entrance pupil, said image constituting an exit pupil subject to positional changes according to the direction of incidence of the light rays so focused;
   blocking means proximal to said exit pupil for partly obstructing the focused light rays while letting pass a beam of such rays subject to variation in beam width caused by shifts in the position of said exit pupil relative to said blocking means;
   second optical means beyond said blocking means for focusing said beam onto a receiving surface, thereby projecting upon said surface a strioscopic pattern of different shades signifying differences in the paths of said light rays;
   photoelectric transducer means at said receiving surface;
   scanning means for sequentially exposing said transducer means to selected portions of said pattern, thereby giving rise to an electrical output signal varying with the brightness of said selected portions;
   and indicator means controlled by said transducer means for registering the variations of said output signal.

2. A system as defined in claim 1 wherein said transducer means comprises a photomultiplier.

3. A system as defined in claim 1 wherein said entrance and exit pupils have the shape of a rectangle, said blocking means comprising a knife with an edge parallel to the minor sides of said rectangle and adjustment means for displacing said knife in a direction parallel to the major sides of said rectangle.

4. A system as defined in claim 1 wherein said entrance and exit pupils have the shape of a rectangle, said blocking means comprising a knife with an edge parallel to the minor sides of said rectangle and adjustment means for displacing said knife parallel to itself in a direction perpendicular to the plane of said exit pupil.

5. A system as defined in claim 1 wherein said transducer means comprises a television camera provided with a screen constituting said receiving surface and with sweep circuits constituting said scanning means.

6. A system as defined in claim 1 wherein said transducer means comprises a television camera.

7. A system as defined in claim 1 wherein said first optical means comprises a concave mirror.

8. A system as defined in claim 7 wherein said second optical means comprises a lens adapted to project an image of said mirror onto said receiving surface, said surface being part of an opaque screen having an aperture aligned with said transducer means, said scanning means including mechanism for relatively displacing said pattern and said screen.

9. A system as defined in claim 8 wherein said third optical means comprises another mirror ahead of the first-mentioned mirror so disposed with reference to said entrance pupil as to convert a bundle of light rays from said entrance pupil into a field of parallel rays trained upon the first-mentioned mirror, and transparent means in the path of said parallel rays defining a channel for a fluid to be tested.

10. A system as defined in claim 8 wherein said mechanism includes a rotatable reflector disposed close to said lens in the path of light rays traversing the latter.

11. A system as defined in claim 1 wherein said indicator means comprises first oscillographic means for displaying a trace of said variations, circuit means connected to the output of said transducer means for integrating said variations, and second oscillographic means for displaying a trace of the integrated signal produced by said circuit means.

12. A system as defined in claim 11 wherein said indicator means further includes a generator of a corrective signal and mixer means for combining said corrective signal with said output signal to establish a reference level for said variations, said first oscillographic means and said circuit means being connected to the output of said mixer.

13. A system for checking the reflecting surface of a concave mirror of substantially spherical curvature, comprising:
   a light source including a rectangular window located in a plane generally perpendicular to the mirror axis and offset from said axis in a position in which said mirror forms an image of said window substantially in line therewith on the opposite side of said axis, said image constituting an exit pupil for reflected light rays subject to positional changes due to surface irregularities according to the paths of light rays reflected by said mirror;
   a knife proximal to the plane of said image, said knife having an edge substantially bisecting said image as produced by any surface portion of said mirror having a predetermined sphericity, said knife thus partly obstructing a beam of light rays reflected toward said exit pupil from an elemental area of said mirror whereby the width of the beam varies with deviations of said elemental area from said predetermined sphericity;
   an opaque screen provided with a scanning aperture;
   lens means beyond said knife and proximal thereto for focusing said beam onto said screen, thereby projecting onto the screen a strioscopic pattern of the mirror surface, said scanning aperture registering with a restricted portion of said pattern;

mechanism for relatively displacing said pattern and said scanning aperture in successive sweeps along parallel lines across said pattern;

and photoelectric transducer means registering with said scanning aperture for generating an output signal in response to variations in the brightness of said pattern.

14. A system as defined in claim 13 wherein said mechanism comprises a rotatable reflector having an axis of rotation generally perpendicular to said mirror axis, said mechanism further including transport means for transversely displacing said screen in the direction of said axis of rotation at an average rate which is slow compared with the sweep of said pattern across said screen upon rotation of said reflector.

15. A system as defined in claim 14, further comprising semitransport means between said lens and said reflector for deviating part of said beam, a second screen positioned to intercept the deviated part of said beam whereby a second strioscopic pattern is formed thereon, said second screen having a slit extending across the area of said second pattern along a line corresponding to a line of the first pattern swept by said scanning aperture, means synchronized with said transport means for relatively displacing said second pattern and said slit in a direction transverse to the latter and in step with the transverse displacement of the first screen, photosensitive means disposed beyond said slit for receiving luminous energy from said second pattern, said luminous energy being modulated by vibrations affecting the system, and circuit means for combining a corrective signal from the output of said photosensitive means with the output signal of said transducer means to compensate for vibration-induced modulations of said output signal.

16. In a system for ascertaining optical-path differences, in combination:

optical means for producing a strioscopic pattern of a test object;

a television camera having a screen positioned to receive said pattern, said camera being provided with sweep means for generating line and frame pulses together with video signals varying with the brightness of said pattern;

a monitoring receiver controlled by said camera for visually reproducing said pattern;

circuit means responsive to said frame pulses for generating a trigger signal coinciding with a selected scanning line of said pattern; and oscillographic means connected to the output of said camera and controlled by said circuit means for producing a trace of the variations of said video signals along the selected scanning line.

17. A system as defined in claim 16 wherein said circuit means includes adjustable delay means for transversely shifting said selected scanning line.

References Cited

UNITED STATES PATENTS

| | | | |
|---|---|---|---|
| 2,231,170 | 2/1941 | Lindenblad | 88—1 |
| 2,362,235 | 11/1944 | Barnes | 35—19.2 |
| 2,435,519 | 2/1948 | Tolson | 178—6 |
| 2,541,437 | 2/1951 | Prescott | 88—56 |
| 2,777,355 | 1/1957 | Lindsey | 88—56 |

OTHER REFERENCES

Deerhake and Herd—Lens Testing Apparatus—February 1965, IBM Tech. Disclosure Bulletin, vol. 7, No. 9, p. 795.

ROBERT L. GRIFFIN, *Primary Examiner.*

JOSEPH A. ORSINO, Jr., *Assistant Examiner.*

U.S. Cl. X.R.

178—6.8; 88—1; 35—19.2